No. 776,542.

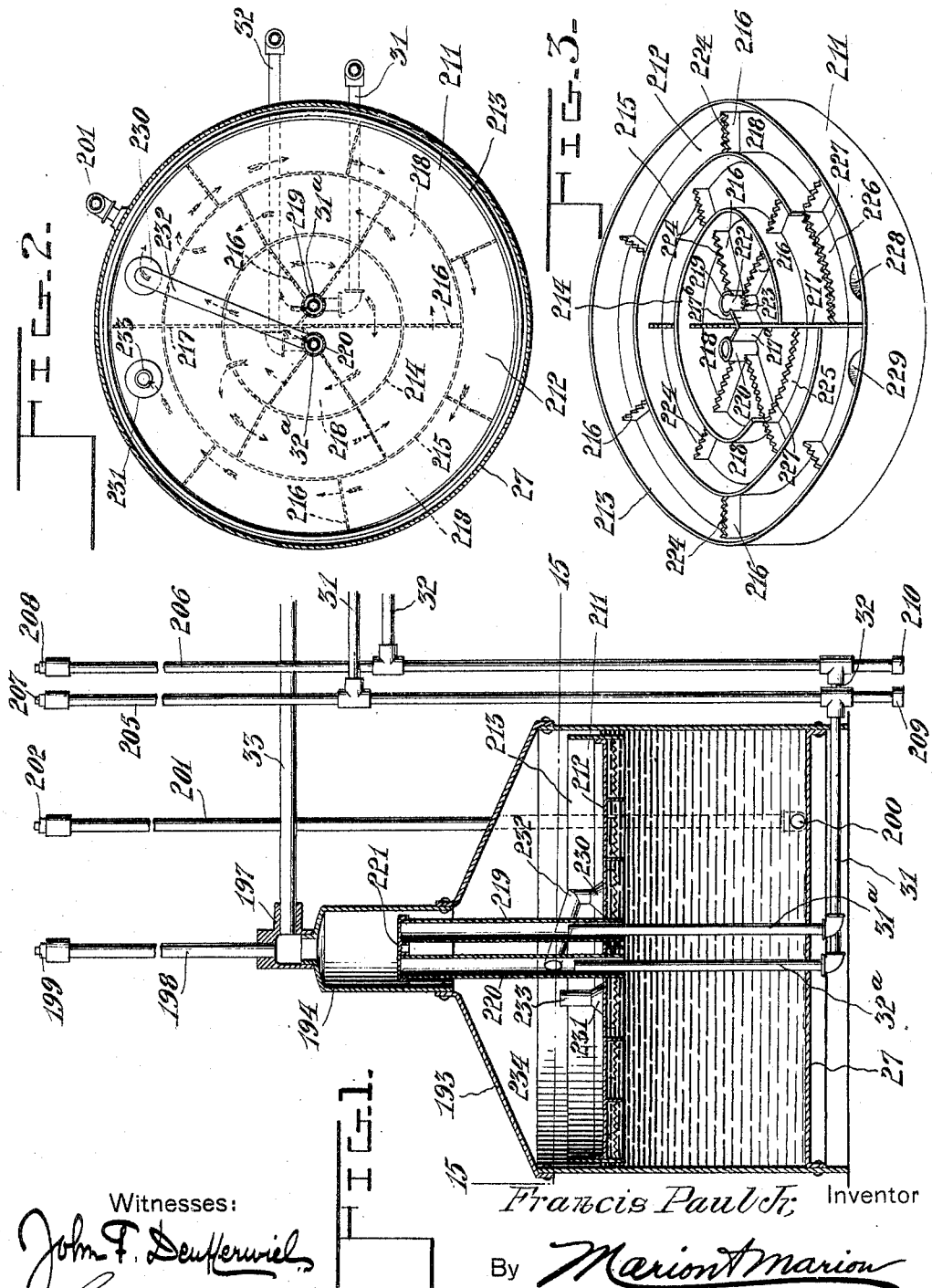

Patented December 6, 1904.

UNITED STATES PATENT OFFICE.

FRANCIS PAUL, JR., OF SOREL, CANADA.

CARBURETER.

SPECIFICATION forming part of Letters Patent No. 776,542, dated December 6, 1904.

Application filed August 7, 1903. Serial No. 168,686. (No model.)

*To all whom it may concern:*

Be it known that I, FRANCIS PAUL, Jr., a subject of the King of Great Britain, residing at Sorel, county of Richelieu, Province of Quebec, Canada, have invented certain new and useful Improvements in Carbureters; and I do hereby declare that the following is a full, clear, and exact description of the invention, such as will enable others skilled in the art to which it appertains to make and use the same.

The invention herein described is a carbureter, and the novelty resides in the peculiar construction and combinations of parts, all as more fully hereinafter described and then particularly pointed out in the appended claims.

The invention is illustrated in the accompanying drawings, wherein—

Figure 1 is an axial section of the gasolene-impregnator. Fig. 2 is a plan section thereof on the line 15 15 of Fig. 1. Fig. 3 is a perspective of the float thereof in inverted position.

The same numerals of reference denote like parts in all the figures of the drawings.

The invention employs the principle of forming a combustible gaseous mixture by impregnating air with light hydrocarbons, such as gasolene, and its manner of operation consists, briefly speaking, in first collecting a suitable air-supply under pressure and subsequently passing this air on its way to the burners through the gasolene-impregnator, which is outside the building and preferably buried in the earth, so that there is no possible way for the explosive gas or vapor of gasolene to accumulate in the building or, in fact, anywhere, it being strictly confined to the impregnating-tank, which is, as stated, completely isolated and buried in the earth. In this invention there is no independent reservoir for gas with a gasometer-bell; but instead the air-supply and pressure is regulated before passing to the burners, and simple mechanism is provided for replenishing this supply as fast as it is exhausted and for keeping the pressure as well as the quality of the mixture constant in the pipes.

27 is the gas-impregnating tank. The air from any suitable air-forcing means is delivered through pipes 31 32 to the impregnating-tank 27, where it takes up the proper quantity of gasolene-vapor, and from thence is returned through the delivery-pipe 33, which connects with the house-main, from whence it is tapped off at burners as required.

I will now describe the means for storing and carbureting, this comprising, as heretofore mentioned, the tank 27 and its appurtenances. The tank 27, which contains the gasolene, is made sufficiently large to hold the entire supply purchased at one time and is preferably buried in the ground and completely covered in, so that no spaces are left for the accumulation of inflammable gas. The tank 27 is preferably made cylindrical, with a conical cover 193, having an opening at the center in which is fixed a cylindrical cupola 194 of sufficient height for the reciprocation of the parts of the float to be described. To the top of the cupola is attached a three-way coupling 197, from the top of which a pipe 198 extends to the surface of the ground, where it is closed by a plug 199. To the other branch of the coupling 197 is attached the delivery-pipe 33, from which the mixed gas is led to the house-main. At a point near the bottom of the tank is an aperture 200, to which is connected the filling-pipe 201, which also extends vertically to the surface of the ground and is closed by a plug 202. The air-delivery pipe 88 from the air-forcing means is branched at 203 to form the two pipes 31 and 32, which are carried horizontally a distance and then vertically downward, then horizontally under the bottom of the tank, and finally up through points near the center of the bottom, forming parallel upstanding portions $31^a$ $32^a$. In the pipe 32 inside the house is placed a valve by which the flow of air through this pipe may be regulated. The vertical portions 205 and 206 of the pipes 31 and 32 are made, as shown, to extend upward to the level of the ground, where they are closed by plugs 207 and 208, and downward below the horizontal portions which lead under the tank to form water-pockets 209 210, closed at their ends. These are for the purpose of enabling any water of condensation to be readily removed, this water collecting in these pockets, and when it is necessary to remove it the plugs 207 and 208 are removed and pumps are inserted in the pipes and carried down to the water-pockets 209 210 and the collected water pumped out.

Within the tank 27 is a float 211, which forms more specifically the gas-impregnating apparatus and rests upon the level of the gasolene in the tank. This float comprises a horizontal circular plate or disk 212, a cylindrical wall 213 surrounding it, and soldered or otherwise hermetically secured thereto, a portion being above and a portion being below the plate, and a plurality of circular concentric partition-walls 214 215 and radial walls 216 217, depending from the lower side of the plate 212 and dividing its lower surface into a plurality of compartments 218, which are open below and form pockets for the reception of gas. At the center of the plate 212 rise a pair of parallel upright tubes 219 220, which are sealed at their upper ends by a disk-shaped cap 221, approximately filling the cross-section of the cupola 194, these tubes depending likewise into the gasolene of the tank and covering the ends of the upright inlet-pipes 31$^a$ 32$^a$, respectively. They are of sufficient height to permit the float 211 to sink nearly to the bottom without these pipes striking against the cap 221. The lower ends of the tubes 219 220 are flush with the lower edges of the partitions 214 215, but while the lower edge of the tube 220 is plane that of the tube 219 is cut away or notched through a certain arc, as shown at 222, the upper edge of this notch being cut into a plurality of angular teeth 223. The radial partition 217, which extends from the center to the periphery of the float, has also a depth equal to the partitions 214 215, as well as its branches 217$^a$ 217$^b$, whereby the gas is prevented from passing under these partitions; but the remaining radial partitions 216 are of less depth than the circular partitions and have also angularly notched or serrated edges 224. Moreover, each circular partition 214 215 has a certain portion thereof 225 226 on alternately opposite sides of the radial partition 217 of less depth than the rest and also provided with serrated edges 227, as shown. Finally in the outermost circular series of partitions at either side of the partition 217 are two apertures 228 229, which are surmounted by funnels 230 231, to which are connected pipes 232 233, the pipe 232 being arranged to connect with the tube 220, while the pipe 233 is short and opens into the gas-chamber 234 above the float 211. When the valve 204 in the branch main 32 is closed, the air from the air-tank 25 will be forced through the pipe 31 and entering the pipe 219 will force the gasolene downwardly therein until it passes through the notched portion 222 and enters the first compartment 218 of the float. It will accumulate therein, forcing the level of the gasolene down until sufficiently deep to pass under the serrated edge of the adjacent radial partition 216 into the next compartment 218 and here will again accumulate until sufficiently deep to pass under the serrated edge of the next radial partition 216 into the next compartment 218, and so on all the way around the inner circle of compartments, then under the cut-away portion 225 of the circular partition 214 and around under the successive partitions of the next concentric series of compartments, thence under the serrated edge 227 of the cut-away portion 226 of the circular partition-wall 215, and thence around the third, or in this case the outer, circle of compartments. It will be understood that as many of these circular series of compartments and also as many radial serrated partitions may be used as found desirable to secure a sufficient impregnation of the air thus injected with gas, the mixture finally passing out through the aperture 229 and tube 233 into the gas-space 234. The air in its passage around the successive compartments by continued bubbling under the serrated edges of the partition-walls will be forced to take up a large quantity of the gasolene-vapor, which is carried with it to the burners. Where only a few lights are burning, it will not be necessary or desirable to pass the air through so many of the compartments of the float, as a sufficient quantity of gasolene will be taken up in a less number of compartments. In this case the valve 204 is opened, which provides a by-pass through the branch main 32, the pipe 32$^a$, the tube 220, and the pipe 232 into the first compartment of the outer circle of the float at once, and in this case the gas will therefore only pass through the outer circle of compartments, the inner circles and the main 31 being short-circuited. Furthermore, the valve 204 enables the exact quantity of gasolene in the burning gas to be regulated to the proper amount, inasmuch as by throttling the valve 204 a certain quantity of the gas can be caused to pass through the pipe 31 in the manner first described.

The quantity of liquid or gasolene in the tank 27 is ascertained by inserting a gage-rod through the pipe 198, the lower end of the gage-rod abutting on the disk 221 and the gage-rod being so graduated as to show directly the number of gallons in the tank for different positions of the float. When the gasolene gets too low, the tank is then filled through the pipe 201, gasolene being poured in until the gage-rod in the pipe 198 has risen to the proper height.

Of course it will be understood that while I have mentioned exclusively gasolene as the combustible material of the gas, any suitable volatile hydrocarbid may be used.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having thus described my invention, what I claim as new, and desire to secure by Letters Patent, is—

1. In a gas-impregnator, an impregnating-float comprising a horizontal plate having a peripheral depending flange, one or more concentric depending partitions on the lower side of said plate, and a plurality of radial partitions dividing the spaces between the concentric partitions into a series of compartments with portions cut away, the height of some of said partitions being less than that of the others, whereby gas delivered under one of the central compartments is caused to pass successively through the others to one of the outer compartments.

2. In a gas-impregnator, an impregnating-float comprising a horizontal plate, a depending peripheral flange thereon, and a plurality of partition-walls dividing the under side of said float into a series of compartments, said partitions being partially cut away in regular series so as to cause gas delivered into one of said compartments to pass successively through the remaining compartments, and the partition-walls under which the gas passes having serrated margins, whereby the gas is divided into small bubbles.

3. In a gas-generating system, the combination of a closed tank adapted to contain a quantity of volatile hydrocarbon and a float resting on the liquid therein and comprising a horizontal plate, a peripheral vertical wall surrounding said plate and extending above and below the same, serrated radial partitions inclosed by the depending wall, a vertical tube rising from the center of said plate and closed at its upper end, and a plurality of partition-walls depending from the lower side of said plate and forming a series of open-bottomed compartments, said tube being adapted to deliver non-combustible gas into the first of said series of compartments, and the last compartment of the series being connected with the gas-space of the tank, in conjunction with a vertical pipe rising from the bottom of said tank to a point within said tube and adapted to deliver non-combustible gas thereinto.

4. In a gas-generating system, the combination of a closed tank, a gas-impregnating float having its bottom divided into a plurality of open-bottomed compartments through which gas is adapted to successively circulate, a pair of delivery-pipes one of which is adapted to deliver gas into the first compartment of the series and the other into an intermediate compartment of the series, the last compartment of the series being connected with the gas-space in the tank, and a valve in said second delivery-pipe, whereby the proportion of non-combustible gas can be regulated.

5. In a gas-generating system, the combination of a closed tank adapted to hold a quantity of volatile hydrocarbon, a float resting on said hydrocarbon and comprising a horizontal plate having a vertical peripheral wall depending into the liquid in said tank, a pair of vertical tubes rising from the center of said float and closed at their upper ends, a pair of delivery-pipes rising from the bottom of said tank and telescoping in the respective tubes, a plurality of partition-walls projecting from the under side of said plate and dividing it into a plurality of open-bottomed compartments arranged in series, whereby gas is caused to pass successively through the compartments of the series, serrated radial partitions upon the under side of the float, a connection between one of said vertical tubes and the innermost compartment of the series, a connection between the other tube and an intermediate compartment of the series, a connection between the last compartment of the series and the gas-space in the tank, means for delivering gas through each of said delivery-pipes, and means for regulating the flow of gas through one of said pipes.

6. In a gas-generating system, the combination of a closed tank adapted to hold a volatile hydrocarbon liquid, a gas-impregnating float therein, radial serrated partitions dividing the under side of the float into a series of compartments and cut away at regular intervals, means for delivering gas into said float, means for conducting impregnated gas from said float to the gas-space in said tank, a pipe conveying off the impregnated gas from said gas-space, and a vertical tubular opening in the cover of said tank through which a gage-rod may be inserted.

7. In a gas-generating system, the combination of a closed tank adapted to hold a volatile hydrocarbon liquid, a gas-impregnating float therein, radial serrated partitions dividing the under side of the float into a series of compartments and cut away at regular intervals, means for delivering gas into said float, means for conducting impregnated gas from said float to the gas-space in said tank, a pipe conveying off the impregnated gas from said gas-space, a vertical tubular opening in the cover of said tank through which a gage-rod may be inserted, and a vertical filling-pipe communicating with said tank at the point near the bottom thereof.

8. In a gas-generating system, the combination of a closed tank having a cylindrical dome on the top thereof, a gas-impregnating float resting on the surface of the liquid therein, a pair of vertical tubes rising from the float and open at their lower ends, a pair of vertical pipes rising from the bottom of said tank and partially telescoping said tubes, a horizontal disk-shaped cap closing the upper ends of said tubes, an opening in the center of the top of said dome through which a gage-rod may be inserted, a vertical filling-pipe communicating with said tank at a point near the bottom thereof, said float having a series of open-bottomed compartments on its lower side, and one of said tubes being adapted to deliver gas into the first of said compartments, a duct connecting the other vertical tube with an intermediate compartment, means for delivering a gaseous material to be impregnated through both said vertical pipes, and means for regulating the flow through one of said pipes.

In witness whereof I have hereunto set my hand in the presence of two witnesses.

FRANCIS PAUL, Jr.

Witnesses:
J. A. MARION,
T. MYNARD.